United States Patent [19]
Desai et al.

[11] Patent Number: 5,448,650
[45] Date of Patent: Sep. 5, 1995

[54] THIN-FILM LATENT OPEN OPTICAL DETECTION WITH TEMPLATE-BASED FEATURE EXTRACTION

[75] Inventors: Kamalesh Desai, Hopewell Junction; Michael E. Scaman, Peekskill; James P. Wood, Beacon, all of N.Y.

[73] Assignee: International Business Machines Corporation, Armonk, N.Y.

[21] Appl. No.: 199,350

[22] Filed: Feb. 18, 1994

Related U.S. Application Data

[63] Continuation of Ser. No. 876,608, Apr. 30, 1992, abandoned.

[51] Int. Cl.$^6$ .............................................. G06K 9/00
[52] U.S. Cl. ..................................... 382/141; 348/126
[58] Field of Search ................... 382/8, 21, 30, 34, 65; 356/394, 398; 348/86, 92, 125, 126, 131

[56] References Cited

U.S. PATENT DOCUMENTS

| | | | |
|---|---|---|---|
| 4,500,202 | 2/1985 | Smyth | 382/8 |
| 4,578,810 | 3/1986 | MacFarlane et al. | 382/8 |
| 4,661,984 | 4/1987 | Bentley | 382/8 |
| 4,720,870 | 1/1988 | Billiotte et al. | 382/8 |
| 4,741,044 | 4/1988 | Polomsky et al. | 382/8 |
| 4,745,296 | 5/1988 | Driller et al. | 382/8 |
| 4,830,497 | 5/1989 | Iwata et al. | 382/8 |
| 5,010,578 | 4/1991 | Siener et al. | 382/8 |
| 5,012,524 | 4/1991 | Le Beau | 382/8 |
| 5,023,917 | 6/1991 | Bose et al. | 382/8 |
| 5,027,418 | 6/1991 | Ikegaya et al. | 382/8 |
| 5,046,109 | 9/1991 | Fujimori et al. | 382/30 |
| 5,048,094 | 9/1991 | Aoyama et al. | 382/8 |
| 5,058,178 | 10/1991 | Ray | 382/8 |

FOREIGN PATENT DOCUMENTS

| | | |
|---|---|---|
| 61-271832 | 3/1986 | Japan . |
| 61-19140 | 7/1986 | Japan . |

*Primary Examiner*—Joseph Mancuso
*Attorney, Agent, or Firm*—Whitham, Curtis, Whitham & McGinn

[57] ABSTRACT

Defects and latent defects are detected in connection patterns on a substrate by automated optical testing using bright field illumination and feature extraction template yielding an improved degree of feature discrimination. The feature extraction templates include angularly disposed vectors requiring detection of a predetermined (e.g. foreground) image value with a predetermined distance and a vector angularly interposed between those vectors which requires no detection of the predetermined image value within a distance which is greater than the predetermined distance. Thus, for successful detection of a defect, a portion of one of a set of templates having such a vector condition configuration must be wedged between areas of an image of a surface having the predetermined image values. This technique is implemented on commercially available automated optical inspection tools and results in avoidance of false detections even in the presence of a high density of image artifacts caused by the topologically sensitive bright field illumination employed.

29 Claims, 3 Drawing Sheets

TEMPLATE A    TEMPLATE B    TEMPLATE C

THIN-FILM LATENT OPEN OPTICAL DETECTION WITH TEMPLATE-BASED FEATURE EXTRACTION

This is a continuation of application Ser. No. 07/876,608 filed Apr. 30, 1992, now abandoned.

BACKGROUND OF THE INVENTION

1. Field of the Invention

The present invention generally relates to the manufacture of electrical devices and, more particularly, to the automated optical inspection of metal patterns on an underlying structure or substrate.

2. Description of the Prior Art

Fabrication of electrical and electronic devices which have included a layer of metal connections formed on an underlying layer or substrate has been a well-known practice. Printed circuits are a well-known example of such structures. Integrated circuits also include similar structures but of a much smaller size. Improvements in materials technology and semiconductor metallurgy, in particular, has resulted in ever greater degrees of miniaturization, circuit complexity and feature density in electrical devices which include such conductors.

As circuit complexity has increased, sophisticated electrical and optical methods of testing for defects have been developed in order to detect defects of a scale comparable to the feature size of the connector pattern formed. Automation of these techniques has become a practical necessity due to the numbers of connections usually present. These automated techniques have been generally effective in detecting actual defects in the pattern.

Electrical continuity testing is often effective and efficient in discovering defects in connection patterns since a network of signal lines may be simultaneously tested. However, there are many types of defects such as shorts to the same node and thin areas of a conductive pattern which cannot be easily detected by electrical testing. Further, the cost and complexity of some circuit modules currently being manufactured makes it economically desirable to repair defective circuits when a defect is discovered and electrical continuity testing rapidly becomes arduous if used to locate the defect for repair. For this reason, optical testing to compare a manufactured connection pattern with an intended pattern has been developed and successfully used to locate actual circuit defects. It should be noted that the location of defects may also be useful in the modification of conductor pattern designs in the manufacturing of devices which are of a scale at which repair is not, in fact, feasible. Since the optical scanning and comparison of an actual pattern with a desired pattern does not vary in procedure with the connection pattern formed, optical testing becomes economically advantageous as pattern complexity increases.

However, especially when conductors are of very small size, contamination of the surface underlying the pattern (hereinafter, simply the "substrate") can create latent defects where the conductor is successfully formed and initially exhibits electrical continuity but which, due to the topology imposed by the contamination or other metallurgical effects or dislodging of the contamination, may later break in service. Such a defect cannot be detected by electrical testing since electrical continuity is initially present. Such defects are difficult to detect optically since the resulting images are of an unpredictable size and shape and cause a wide variety of resultant pattern irregularities when the pattern is optically scanned. Such variations may be substantially smaller than the minimum feature size of the pattern being produced and potentially on a scale of acceptable manufacturing variations in a good pattern. To date, there has been no optical technique which is susceptible to automation which will reliably detect latent defects. Because of the scale of variations in optically sensed patterns relative to the scale of acceptable manufacturing variation, known optical testing techniques have either caused the rejection of devices with good patterns or failed to detect the latent defects with sufficient effectiveness to allow potential manufacturing yields to be realized and to adequately avoid the subsequent failure of components after they are put in service.

It is to be understood that optical testing equipment is commercially available to automate the testing process. Such equipment is capable of detecting variations in optically sensed patterns of a size sufficient to test patterns with any minimum feature size currently being produced and capable of detecting the shape of a variation from a desired pattern in any orientation in an automated manner. However, due to the similarity of dimension of acceptable manufacturing variation to variations in sensed patterns caused by contamination and other source of latent defects, such equipment tends to reject some good patterns while passing some containing latent defects. Both types of errors tend to increase the cost of the circuits produced and reduce the efficiency of the manufacturing process.

The illumination used in optical testing of surface patterns include so-called dark field and bright field illumination techniques used either separately or together and at different spectral frequencies in the optical testing of circuit connection patterns. Bright field illumination is very sensitive to variations in surface topology and results in many imaging artifacts representing acceptable variations in topology and which may cause difficulty in analysis of images and many false defect detections. However, latent defects due to contamination of a substrate are typically of fairly shallow topology (especially in cases where electrical continuity is maintained) and are better imaged by bright field illumination, alone.

Several different forms of image analysis are typically used in a battery of tests to determine if a connection pattern which has been produced is of acceptable quality and free from defects. However, the discovery of latent defects at low rates of false detection and undetected faults has been particularly difficult to achieve since many defects yield images similar to those produced as portions of a correctly formed desired pattern.

SUMMARY OF THE INVENTION

It is therefore an object of the present invention to provide a method and apparatus which can sense variations in an optically sensed pattern and reliably distinguish not only actual defects but also latent defects from acceptable manufacturing variations in the sensed pattern.

It is a further object of the invention to provide a technique and apparatus of feature extraction which is applicable to images obtained with bright field illumination and which has the property of producing a minimum number of false detections and escapes (e.g. undetected defects).

In order to accomplish these and other objects of the invention, an optical inspection tool is provided including at least one wedge feature extraction template requiring detection of a predetermined image value within a predetermined distance from an origin along each of two angularly separated vectors and no detection of said predetermined image value along at least one vector angularly interposed between said two angularly separated vectors for a distance greater than said predetermined distance.

In accordance with another aspect of the invention, a wedge feature extraction template is provided requiring detection of a predetermined image value within a predetermined distance from an origin along each of two angularly separated vectors and no detection of said predetermined image value along at least one vector angularly interposed between said two angularly separated vectors for a distance greater than said predetermined distance.

In accordance with a further aspect of the invention, a set of feature extraction wedge templates is provided including at least one template having a first vector requiring no detection of said predetermined image value within a length m, a second vector requiring no detection of said predetermined image value within at least one of a length l and a length m and angularly spaced clockwise from said first vector, a third vector requiring detection of said predetermined image value within a length s and angularly spaced clockwise from said second vector, a fourth vector requiring no detection of said predetermined image value within a length l and angularly spaced clockwise from said third vector, a fifth vector requiring detection of said predetermined image value within a length s and angularly spaced clockwise from said fourth vector, and a sixth vector requiring no detection of said predetermined image value within at least one of a length l and a length m and angularly spaced clockwise from said second vector and wherein $s<m<l$.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
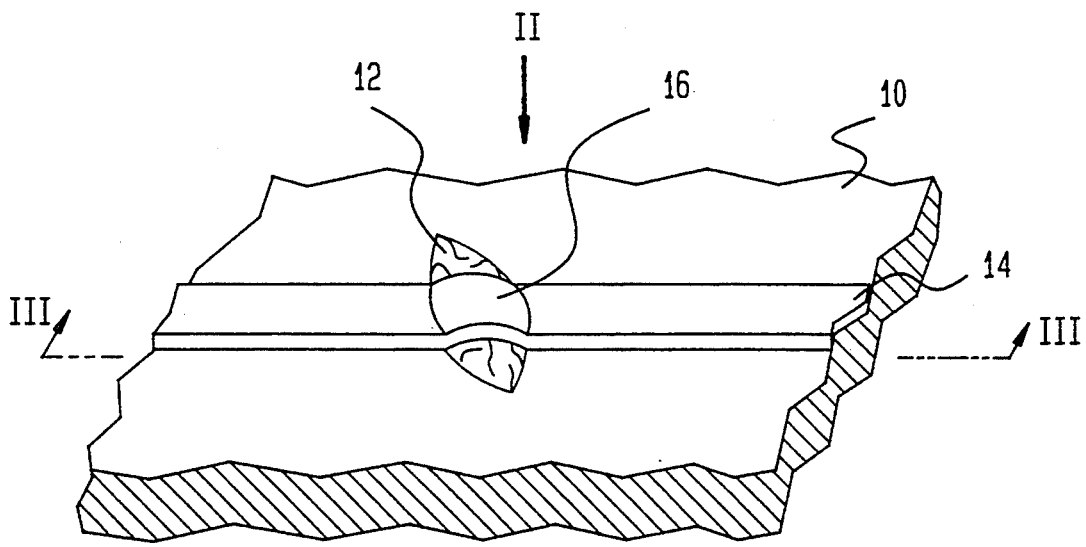
FIG. 1 is an isometric view of a portion of a substrate with a connection having a latent defect formed thereon.

Referring now to the drawings, and more particularly to FIG. 1, there is shown a portion of a substrate 10 with a metal conductor 14 formed thereon. In this case, as illustrated, a contamination particle 12 is present on the substrate and the conductor 14 has been formed thereover. In such a case, electrical continuity may or may not be maintained due to the topography imposed by the contamination, particularly at the edge 16 thereof. For purposes of explanation of the invention, it is assumed that electrical continuity has been maintained, at least at this point of the manufacture of the device in which the substrate is to be included. Therefore, as pointed out above, the latent defect illustrated cannot be detected by electrical continuity testing and optical inspection or testing must be relied upon.

Several types of illumination are known in the art for optical imaging. So-called dark field illumination involves illumination of the field (e.g. the surface to be inspected) at a shallow angle to produce shadow which are observed and analyzed. Since the profile of topological variation due to contamination is typically fairly low when electrical continuity is maintained, however, this type of illumination does not provide optimum imaging of such latent defects. As an alternative, so-called bright field illumination in which both collimated illumination and sensing of reflected light is done at an angle near normal to the imaged surface yields a more detailed image of small angular variations in topology.

Figure 3:
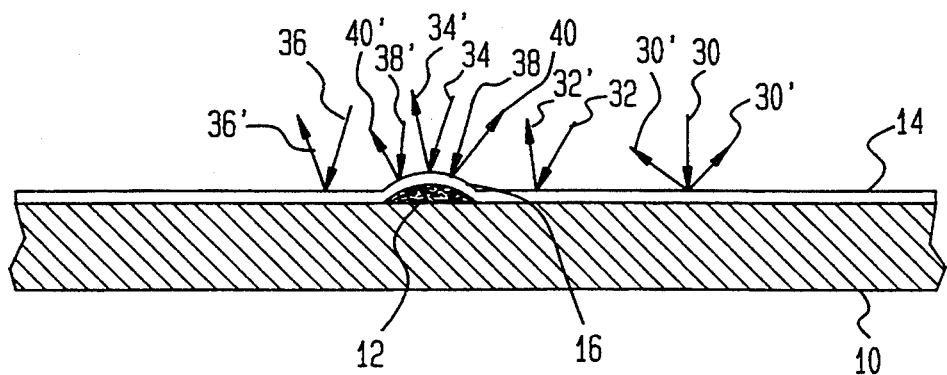
FIG. 3 is a sectional view of the substrate of FIG. 1 taken at section line III—III.

Specifically, as illustrated in FIG. 3, incident light at a high angle near normal to the imaged surface and which impinges on the substrate, as indicated at 30, is largely scattered, as indicated at 30', and imaged as pattern background (e.g. not part of the pattern, per se) while similar collimated illumination 32, 36 impinging on a portion of the conductor pattern is reflected at a generally predictable angle and will be imaged as part of the conductor pattern and distinct from the background.

In the vicinity of a variation in topology such as may be characteristic of a latent defect caused by contamination 12, a sharp change of contrast will be imaged across the area involved. Specifically, collimated light incident on areas of the conductor near the edges of the contamination 12, as shown at 38, 38', will be reflected at a much different angle 40, 40' than at other locations on the conductor pattern such as 32', 36'. Also, at one or more points of the latent defect, light 34 will be reflected at the same angle as other locations on the conductor pattern. However, this latter reflection 34' may or may not be of sufficient intensity and/or area to be imaged.

Figure 2:
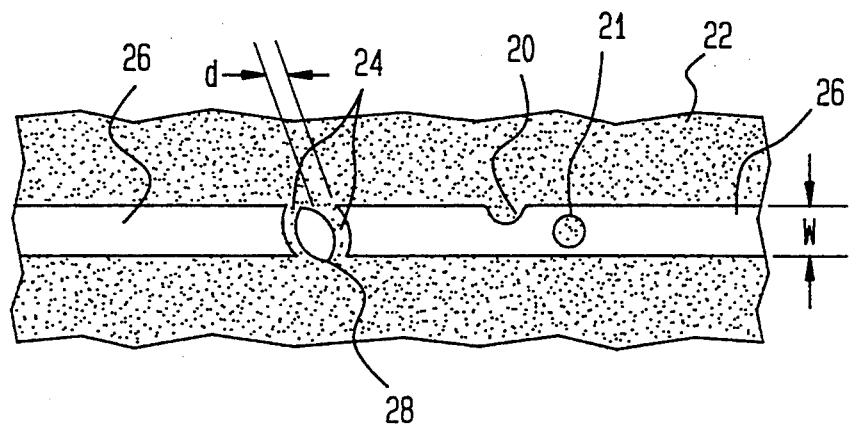
FIG. 2 is a plan view of the upper surface of FIG. 1 as it would appear in an optically scanned image.

The resulting image is shown in FIG. 2. The defect free portion of the conductor is imaged as foreground 26 and the substrate is imaged as background 22. The latent defect is imaged as a foreground spot 28 bounded by two background bands 24. It should be noted that the background bands could potentially have a width d which is substantially smaller than the minimum feature size (e.g. conductor width w) or substantially larger, depending on the size, shape and profile of any contamination which compromises the conductor and would affect the way spot 28 is imaged, if it can be imaged at all. It must also be recalled that actual defects must also be detected by this process and which will be imaged at much larger sizes while acceptable manufacturing variations such as a change in conductor width or topological depression, indicated by notch 20 and area 21 (caused by a depression), respectively, for purposes of providing an indication of the possible size thereof, must be discriminated.

It should be noted, in this latter regard, that the sensitivity of bright field illumination to topological variations of the imaged surface is very high, particularly where an illumination wavelength is chosen to maximize contrast of the conductors with a polyimide substrate commonly used in the so-called distribution layers of multi-layer ceramic (MLC) structures (e.g. preferably 550 nm.). Accordingly, many normal features of the conductor layer may be imaged as background, as in the case of notch 20 or depression 21. Such structures may include so-called brick interfaces, stud depressions, metal to metal edges and the like. For example, a particularly heavy gold connection line will usually exhibit a curvature across the width thereof and will be imaged, in bright field illumination, as much narrower than it actually is. Conversely, topological variations of the substrate may cause a concentration of reflected light which will cause a foreground value artifact to be imaged. Therefore, it can be readily understood that image analysis techniques which rely on minimum line and space separations are largely useless for discriminating the type of defect of interest here when bright field illumination is used. Feature detection techniques which are presently known in the art will also fail because, as in the case of the heavy gold connection, the dimensions of the feature, as imaged, will vary substantially from the pattern actually produced. This problem is aggravated by the high sensitivity to variations in surface topology which are imaged by bright field illumination, causing numerous image artifacts which cause known image analysis techniques to break down.

In order to achieve improved discrimination capability, the present invention provides one or more wedge templates, which are specified in terms of vectors emanating at angular intervals from an arbitrary point (e.g. image pixel location) on the imaged surface and determining, along those vectors, the points at which foreground image values, if any, are encountered. The condition of encountering or not encountering foreground information within a predetermined distance from the origin of each of the vectors of the template can then be used to determine whether the image area in the vicinity of any given image pixel location satisfies the pattern of the template. More specifically, the templates according to the invention are designed to result in positive detection only when wedged between portions of the imaged pattern in a novel manner in order to discriminate the latent defects of interest.

Figure 4:
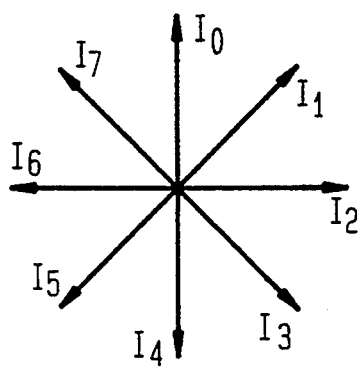
FIG. 4 is an illustration of a convention for template ray tests in accordance with the invention.

FIG. 4 shows an array of vectors and reference numerals which will be used as a convention in the further detailed discussion of the invention, below. It is to be understood that commercial automated optical inspection tools provide for the rotation of this array of vectors and, hence, the rotation of the templates. In FIG. 4, the vectors are preferably arranged at equal angular intervals of 45° and, as a convention, numbered clockwise from $I_0$ consecutively through $I_7$. Eight vectors are considered to be a minimum number which is currently preferred because of the rotation capabilities currently available in automated optical inspection machines. However, it is to be understood that other larger numbers of vectors at correspondingly smaller or varied angular separations could also be used.

Figure 5:
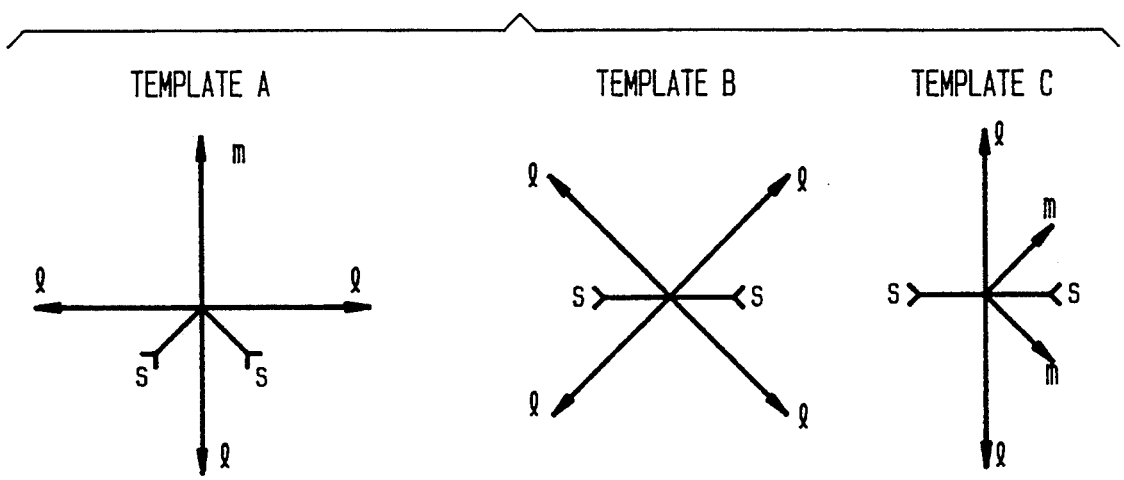
FIG. 5 is an illustration of feature extraction templates in accordance with the invention.

Three wedge templates in accordance with the invention are shown in FIG. 5. In these templates, an arrow is used to indicate that a foreground feature is not found within a particular distance of m or l. A reversed arrow or forked end of a vector is used to indicate that an edge of a foreground image feature is encountered with a distance s. This difference in detection of an edge is implicit in the requirement that a foreground feature must be encountered within a distance which is less than s. It may be useful to observe that s, m and l are used to indicate relative distance magnitudes of small, medium and large, respectively. These templates may be respectively described by the following logic expressions:

Template A—
$(I_0 > m) \cdot (I_2 \geq 1) \cdot (I_4 \geq 1) \cdot (I_6 \geq 1)$.
$(I_3 < s) \cdot (I_6 < s)$, Template B—
$(I_1 \geq 1) \cdot (I_3 \geq 1) \cdot (I_5 \geq 1) \cdot (I_7 \geq 1)$.
$(I_2 < s) \cdot (I_6 < s)$, and Template C—
$(I_0 \geq 1) \cdot (I_4 \geq 1) \cdot (I_1 > m) \cdot (I_3 > m)$.
$(I_2 < s) \cdot (I_6 < s)$.

Of course it is to be understood that other templates could be used or that the values of s, m and l could be changed in consideration of particular pattern characteristics. The most important feature of the templates in accordance with the invention is the vectors of length s which are either opposed to each other or separated by a longer vector over the length of which a foreground image value is not detected. It is this feature which causes detection of a defect or latent defect only when a template or at least one vector thereof is wedged into gaps in the foreground image. Therefore, the templates are not only able to detect gaps in the areas of foreground image values but are also able to do so only when the apparently separated portions of a conductor can also be detected.

When it is considered that each of s, m and l are particular distances along each respective vector and can thus be easily translated into particular coordinates, it is clear that these expressions represent combinations of go/no go tests which may be rapidly performed. Since the terms of the expressions are ANDed, the violation of any term describing a template causes the possible detection by a template to be rejected. The location of the intercept of a vector and the nearest foreground image value is simply compared with coordinates corresponding to distances s, m and l from the origin or pixel location, comparisons made and any failure of the defined conditions detected as assigned to each vector at each rotation of the template. The potential latent defects thus identified may be later evaluated to determine whether or not a latent defect, in fact, exists and whether or not corrective action should be taken.

Figure 6:
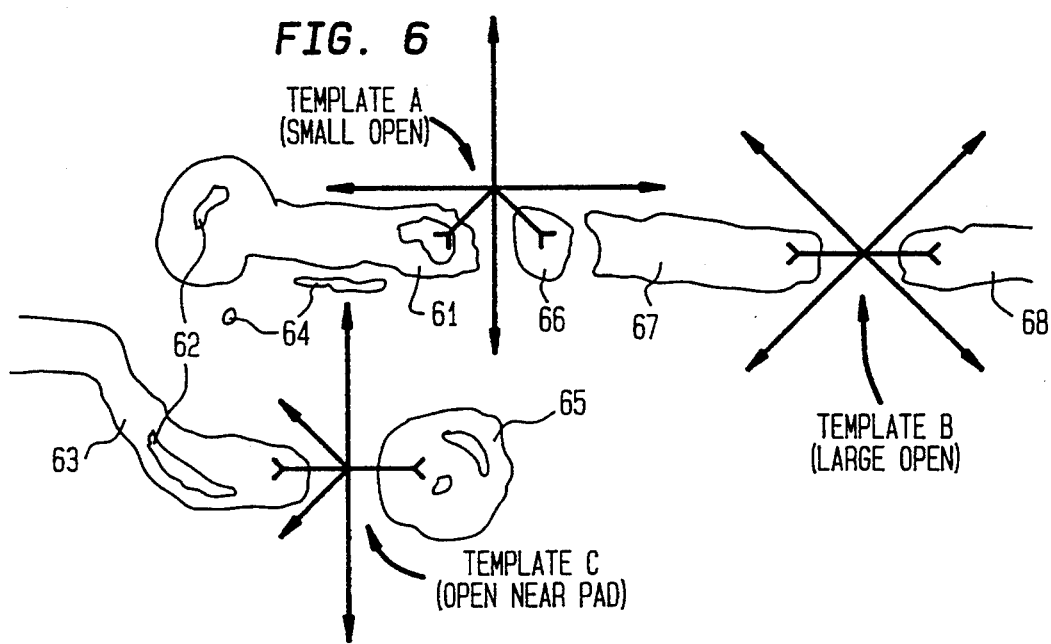
FIG. 6 shows application of the templates of FIG. 5 to an optically sensed image of a conductor pattern containing latent defects.

The function of the templates A, B and C will be evident from a consideration of FIG. 6 in which these templates are applied to various types of foreground/background boundaries. Also, in FIGS. 5–8, nominal values of s, m and l are set as $s = 2 \times$ nominal minimum feature size (e.g. line width), m < line pitch (e.g. minimum line spacing on centers) and $l \sim 1.414 \times m$. In practice, these values can often be empirically refined, depending on the actual patterns, the processes by which the patterns are produced and the particulars of the illumination and optical sensing set-up used.

In FIG. 6, an image of various lines appears to be divided into a plurality of segments due to the high sensitivity of bright field illumination. Segments 61, 66 and 67 generally correspond to the image of a latent defect as shown in FIG. 2. An actual large defect is shown between segments 67 and 68. A latent or actual defect near a pad is shown between segments 63 and 65. Background image values within the foreground pattern are shown at 62 and foreground value image artifacts are shown at 64.

Template A principally detects latent defects since the vectors in the $I_2$ and $I_6$ directions parallel the connection, the $I_4$ direction vector wedges into the foreground image gap while the $I_3$ and $I_5$ direction vectors pick up the remainder of the line. The $I_0$ vector serves to avoid multiple detections of the same defect and undetected latent defects by causing the template conditions to fail if an adjacent line is detected (since m is set to be slightly less than the minimum line separation).

Template B detects large opens in the pattern by detecting the proximity of two pattern areas within a distance of 2s while no foreground values are detected within the on-center line spacing distance, measured diagonally. These diagonal vectors also assist in detection of defects only when the template is centered on the line.

Template C detects either large openings (in the same basic manner as template B) as well as small or latent openings but, by omission of some diagonals can make a detection close to a pad. The vectors of length l in the $I_0$ and $I_4$ directions also assist in centering the template and avoiding multiple detections of the same defect while the diagonal vectors distinguish between the line and the pad.

It should be noted that none of the templates A, B or C will be satisfied at any other point of FIG. 6 except possibly between segments 66 and 67, which would serve to even more specifically detect the defect shown in FIGS. 1-3. This is true even though many imaging artifacts of substantial size are present in the image being analyzed.

As alluded to above, the most important functional feature of these templates is the placement of the vectors of length s relative to the vectors of lengths m and l. The opposition of the s vectors in templates B and C assures centering on the interrupted conductor. The maximum length gap which will be detected is, in accordance with the preferred nominal value of s, approximately four times the line width. In practice, this is considered to be a gap of exceptional length and, therefore, the upper limit of the range of gap lengths detectable is very large. Conversely, the angled positioning of the s length vectors on either side of an l length vector in Template A insures that, for detection, the l length vector is wedged between areas of foreground image value. Therefore there is effectively no lower limit on the narrowness of gap detectable. All that is required is that the ends of the foreground image not present an angle such that the l vector is overlaid by foreground image areas on both sides of the gap. In practice, defects of such a shape have been found to be sufficiently rare as to be negligible.

Figure 7:
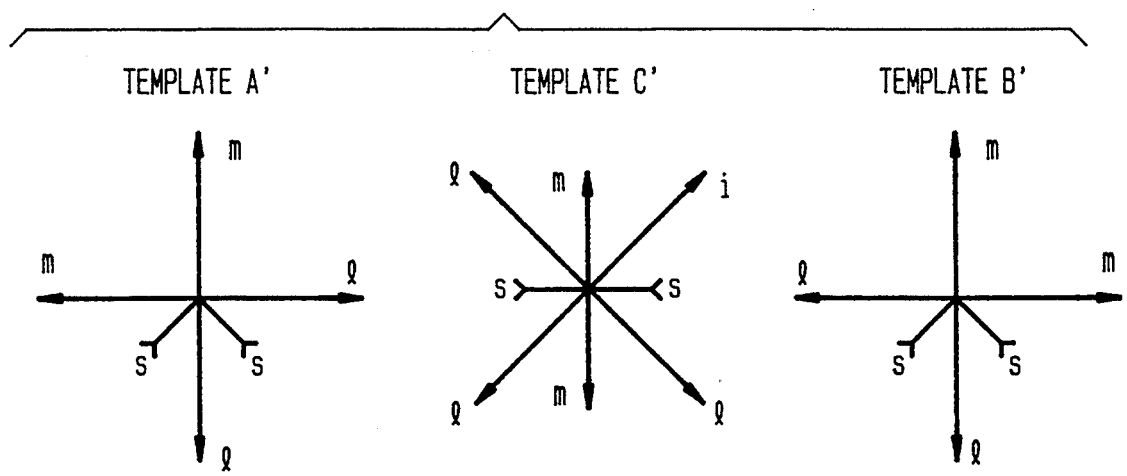
FIG. 7 is an illustration of feature extraction templates in accordance with a preferred embodiment of the invention.
Figure 8:
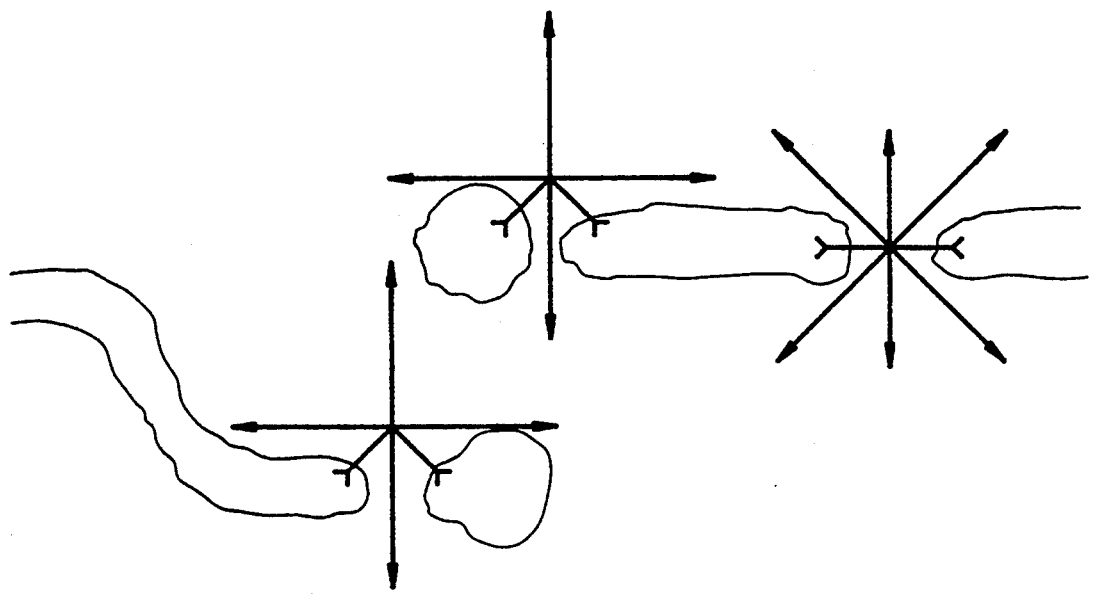
FIG. 8 shows application of the templates of FIG. 7 to an optically sensed image of a conductor pattern containing latent defects.

In accordance with a preferred embodiment of the invention, an alternative set of templates is illustrated in FIG. 7. This set of templates is defined by respective logic expressions as follows:

Template A'—
$(I_0 \geq m) \cdot (I_2 \geq 1) \cdot (I_4 \geq 1) \cdot (I_6 \geq m)$.
$(I_3 < s) \cdot (I_5 < s)$,
Template B'—
$(I_0 \geq m) \cdot (I_2 \geq m) \cdot (L \geq 1) \cdot (I_6 \geq 1)$.
$(I_3 < s) \cdot (I_5 < s)$, and
Template C'—
$(I_1 \geq 1) \cdot (I_3 \geq 1) \cdot (I_5 \geq 1) \cdot (I_7 \geq 1)$.
$(I_0 \geq m) \cdot (I_4 \geq m) \cdot (I_2 < s) \cdot (I_6 < s)$.

These templates may be easily processed in the same manner as templates A, B and C, discussed above. They also share the same characteristics of orientation of the vectors of length s and must therefore be wedged between areas of foreground image value in order to discriminate a latent or actual defect.

Templates A' and B' are mirror images of each other and both are quite similar to template a of FIG. 5. By providing for asymmetry and possibly by reducing the nominal value of m, this pattern has been found to be somewhat more stable in detection of defects or latent defects close to a pad than template C of FIG. 5 while being equally effective at detection of latent defects in lines if the pad size is not much greater than twice the connection line width. The $I_0$ vector of length m in templates A' and B' avoids false detections where a line passes close to two or more closely spaced islands or pads. Accordingly, template C has no counterpart in FIG. 7 but could be used therewith if desired and particularly in conjunction with a pattern including large pads. For instance, some valuable information could be found if template C of FIG. 5 resulted in a positive detection which was not confirmed by either template A' or B'.

Template C' detects large opens in the same manner as template C but provides additional false positive suppression by assisting in the centering of the template on the line and rejecting of artifacts around pads and large areas of background image values which can occur in a stud depression but should be, in part, circumscribed by foreground values. Incidentally, in this regard, the defect detection provided by the present invention is particularly effective in areas of an MLC or similar device where an array of pads are provided for connection to a chip and where the so-called distribution wiring is particularly densely formed.

It should be particularly noted that the templates of FIGS. 5 and 7, by the use of paired vectors of s length and which requires detection of a foreground value within that distance, limits detection to instances where a portion of the template is wedged between foreground values and no other foreground values are encountered along other predetermined vectors. This limitation of detection closely matches the image foreground regions corresponding to latent and actual defects when the highly topologically sensitive bright field illumination is employed. Thus, by effectively gathering a greater amount of optical information by means of bright field illumination and then determining potential defects with a higher degree of discrimination, a far more accurate technique of optical testing of connection patterns has been provided.

As indicated above, while the nominal values indicated for s, m and l will yield substantially more reliable results than previously known optical testing processes, the rate of false positive detection and the number of defects and latent defects missed can be further improved by adjusting nominal values of s, m and l in accordance with empirically derived data to match the images created by the specifics of the bright field illumination and detection utilized. By the same token, the specifics of the bright field illumination and detection can be adjusted to discriminate certain variations in topology of the imaged surface. Likewise, the invention can be used in conjunction with other statistical, optical or feature extraction techniques to further improve performance such as establishing a "don't care" zone along the edges of certain types of connection lines (e.g. the heavy gold lines mentioned earlier) to reduce image artifact density.

Also, it should be noted that the templates in accordance with the invention assist in the speed of operation of commercially available optical testing tools since the symmetry of some templates eliminate a substantial number of the rotations which must be tested. Further, since all templates may be described in terms of ANDed conditions, only one violation of the template conditions need be found for a possible detection to be rejected. As a measure of the testing speed which can be achieved, a 5.2 gigapixel image field has been processed in accordance with the templates of the present invention in three minutes and twelve seconds.

As noted above, the technique of the present invention is particularly effective in extremely dense portions of the image pattern. Accordingly, the throughput of the process in accordance with the invention could be increased by limiting its application to such areas. Whether or not such limitation is done, merger of the data obtained by the technique in accordance with the invention can be merged with defect data derived through other optical or electrical techniques which may have similar preferential applicability to optimize overall defect detection accuracy and throughput rates.

It should also be noted that since the invention provides increased accuracy and throughput with increased density of features in the desired pattern being tested, it is particularly applicable to patterns which contain redundant wiring which may be formed in long lines, as in the fabrication of display panels. Further, the improved performance at increased feature densities due to the wedging effect of the templates of the type disclosed insures that the invention is applicable to current technologies and other technologies which may allow increased feature density in the future.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An optical inspection tool for use with bright-field illumination and for detecting defects in a structure, said defects including three-dimensional defects, said optical inspection tool including:
   at least one wedge feature extraction template including two angularly separated vectors having an origin and at least one vector angularly interposed between said two angularly separated vectors; and
   means for determining a presence of said defects in said structure, said means for determining including:
   a means for registering detection of a predetermined image value within a predetermined distance from said origin along each of said two angularly separated vectors, and for providing a first output; and
   a means for registering no detection of said predetermined image value along said at least one vector angularly interposed between said two angularly separated vectors for a distance greater than said predetermined distance, and for providing a second output;
   said at least one wedge feature extraction template being positioned between a portion of an imaged pattern of said structure and for detecting said three-dimensional defects in said structure based on said first and second outputs of said means for registering.

2. An optical inspection tool as recited in claim 1, wherein said two angularly separated vectors are separated by an angle of approximately 90° and said at least one angularly interposed vector is angularly separated from each of said two angularly separated vectors by an angle of approximately 45°.

3. An optical inspection tool as recited in claim 1 including a set of at least three of said wedge templates which respectively differ from each other.

4. An optical inspection tool as recited in claim 3 wherein one of said wedge templates includes a template including
   a first vector requiring no detection of said predetermined image value within a length m,
   a second vector requiring no detection of said predetermined image value within a length l and angularly spaced clockwise from said first vector,
   a third vector requiring detection of said predetermined image value within a length s and angularly spaced clockwise from said second vector,
   a fourth vector requiring no detection of said predetermined image value within a length l and angularly spaced clockwise from said third vector,
   a fifth vector requiring detection of said predetermined image value within a length s and angularly spaced clockwise from said fourth vector, and
   a sixth vector requiring no detection of said predetermined image value within a length l and angularly spaced clockwise from said second vector and wherein $s<m<l$.

5. An optical inspection tool as recited in claim 4, wherein said fourth vector is angularly separated from each of said third and fifth vectors by an angle of approximately 45°.

6. An optical inspection tool as recited in claim 3 wherein one of said wedge templates includes a template including
   a first vector requiring no detection of said predetermined image value within a length l,
   a second vector requiring detection of said predetermined image value within a length s and angularly spaced clockwise from said first vector,
   a third vector requiring no detection of said predetermined image value within a length l and angularly spaced clockwise from said second vector,
   a fourth vector requiring no detection of said predetermined image value within a length l and angularly spaced clockwise from said third vector,
   a fifth vector requiring detection of said predetermined image value within a length s and angularly spaced clockwise from said fourth vector, and
   a sixth vector requiring no detection of said predetermined image value within a length l and angularly spaced clockwise from said second vector and wherein $s<m<l$.

7. An optical inspection tool as recited in claim 6, wherein said second and fifth vectors are angularly separated from at least one of said first, third, fourth and sixth vectors by an angle of approximately 45°.

8. An optical inspection tool as recited in claim 3 wherein one of said wedge templates includes a template including
- a first vector requiring no detection of said predetermined image value within a length l,
- a second vector requiring no detection of said predetermined image value within a length m and angularly spaced clockwise from said first vector,
- a third vector requiring detection of said predetermined image value within a length s and angularly spaced clockwise from said second vector,
- a fourth vector requiring no detection of said predetermined image value within a length m and angularly spaced clockwise from said third vector,
- a fifth vector requiring no detection of said predetermined image value within a length l and angularly spaced clockwise from said fourth vector, and
- a sixth vector requiring detection of said predetermined image value within a length s and angularly spaced clockwise from said second vector and wherein $s<m<1$.

9. An optical inspection tool as recited in claim 8, wherein said third vector is angularly separated from each of said third and fifth vectors by an angle of approximately 45° and said sixth vector is angularly separated form said first and fifth vectors by approximately 90°.

10. An optical inspection tool as recited in claim 8, wherein said fourth vector is angularly separated from each of said third and fifth vectors by an angle of approximately 45°.

11. An optical inspection tool as recited in claim 3 wherein one of said wedge templates includes a template including
- a first vector requiring no detection of said predetermined image value within a length m,
- a second vector requiring no detection of said predetermined image value within a length l and angularly spaced clockwise from said first vector,
- a third vector requiring detection of said predetermined image value within a length s and angularly spaced clockwise from said second vector,
- a fourth vector requiring no detection of said predetermined image value within a length l and angularly spaced clockwise from said third vector,
- a fifth vector requiring detection of said predetermined image value within a length s and angularly spaced clockwise from said fourth vector, and
- a sixth vector requiring no detection of said predetermined image value within a length m and angularly spaced clockwise from said second vector and wherein $s<m<1$.

12. An optical inspection tool as recited in claim 3 wherein one of said wedge templates includes a template including
- a first vector requiring no detection of said predetermined image value within a length m,
- a second vector requiring no detection of said predetermined image value within a length l and angularly spaced clockwise from said first vector,
- a third vector requiring detection of said predetermined image value within a length s and angularly spaced clockwise from said second vector,
- a fourth vector requiring no detection of said predetermined image value within a length l and angularly spaced clockwise from said third vector,
- a fifth vector requiring no detection of said predetermined image value within a length m and angularly spaced clockwise from said fourth vector,
- a sixth vector requiring no detection of said predetermined image value within a length l and angularly spaced clockwise from said fifth vector,
- a seventh vector requiring detection of said predetermined image value within a length s and angularly spaced clockwise from said sixth vector, and
- an eighth vector requiring no detection of said predetermined image value within a length l and angularly spaced clockwise from said second vector and wherein $s<m<1$.

13. An optical inspection tool as recited in claim 12, wherein said third and seventh vectors are angularly separated from at least one of said second, fourth, sixth and eighth vectors by an angle of approximately 45°.

14. An optical inspection tool as recited in claim 3 wherein one of said wedge templates includes a template including
- a first vector requiring no detection of said predetermined image value within a length m,
- a second vector requiring no detection of said predetermined image value within a length m and angularly spaced clockwise from said first vector,
- a third vector requiring detection of said predetermined image value within a length s and angularly spaced clockwise from said second vector,
- a fourth vector requiring no detection of said predetermined image value within a length l and angularly spaced clockwise from said third vector,
- a fifth vector requiring detection of said predetermined image value within a length s and angularly spaced clockwise from said fourth vector, and
- a sixth vector requiring no detection of said predetermined image value within a length l and angularly spaced clockwise from said second vector and wherein $s<m<1$.

15. An optical inspection tool as recited in claim 14, wherein said fourth vector is angularly separated from each of said third and fifth vectors by an angle of approximately 45°.

16. A feature extraction wedge template for use with bright-field illumination and for detecting defects in a structure, said defects including three-dimensional defects, said feature extraction wedge template including:
- two angularly separated vectors having an origin and at least one vector angularly interposed between said two angularly separated vectors; and
- means for determining a presence of said defects in said structure, said means for determining including:
- a means for registering detection of a predetermined image value within a predetermined distance from said origin along each of said two angularly separated vectors, and for providing a first output;
- a means for registering no detection of said predetermined image value along said at least one vector angularly interposed between said two angularly separated vectors for a distance greater than said predetermined distance, and for providing a second output;
- said at least one wedge feature extraction template being positioned between a portion of an imaged pattern of said structure and for detecting said three-dimensional defects in said structure based on said first and second outputs of said means for registering.

17. A feature extraction wedge template as recited in claim 16, wherein said two angularly separated vectors are separated by an angle of approximately 90° and said at least one angularly interposed vector is angularly separated from each of said two angularly separated vectors by an angle of approximately 45°.

18. A set of feature extraction wedge templates for use with bright-field illumination and for detecting defects in a structure, said defects including three-dimensional defects, said set of feature extraction wedge templates including:
   at least one template, said at least one template including:
      a plurality of vectors, each of said plurality of vectors having a common original; and
      registering means associated with each of said plurality of vectors; said registering means for registering no detection of a predetermined image value within a length m of a first vector of said plurality of vectors and for providing a first output,
   said registering means for registering no detection of said predetermined image value within at least one of a length l and a length m of a second vector of said plurality of vectors and for providing a second output, said second vector being angularly spaced clockwise from said first vector,
   said registering means for registering detection of said predetermined image value within a length s of a third vector of said plurality of vectors and for providing a third output, said third vector being angularly spaced clockwise from said second vector,
   said registering means for registering no detection of said predetermined image value within a length l of a fourth vector of said plurality of vectors and for providing a fourth output, said fourth vector being angularly spaced clockwise from said third vector,
   said registering means for registering detection of said predetermined image value within a length s of a fifth vector of said plurality of vectors and for providing a fifth output, said fifth vector being angularly spaced clockwise from said fourth vector,
   said registering means for registering no detection of said predetermined image value within at least one of a length l and a length m of a sixth vector of said plurality of vectors and for providing a sixth output, said sixth vector being angularly spaced clockwise from said second vector and wherein s<m<l, said at least one template being positioned between a portion of an imaged pattern of said structure;
   three-dimensional defects in said structure being detected based on said first, second, third, fourth, fifth and sixth outputs.

19. A set of feature extraction wedge templates as recited in claim 18, wherein said fourth vector is angularly separated from each of said third and fifth vectors by an angle of approximately 45°.

20. A set of feature extraction wedge templates as recited in claim 18 wherein
   said second vector requires no detection of said predetermined image value within a length l and
   said sixth vector which requires no detection of said predetermined image value within a length l.

21. A set of feature extraction wedge templates as recited in claim 18, wherein
   said second vector requires no detection of said predetermined image value within a length m and
   said sixth vector which requires no detection of said predetermined image value within a length l.

22. A set of feature extraction wedge templates as recited in claim 18, wherein
   said second vector requires no detection of said predetermined image value within a length l and
   said sixth vector which requires no detection of said predetermined image value within a length m.

23. A set of feature extraction wedge templates as recited in claim 18 wherein one of said wedge templates includes
   a first vector requiring no detection of said predetermined image value within a length l,
   a second vector requiring detection of said predetermined image value within a length s and angularly spaced clockwise from said first vector, a third vector requiring no detection of said predetermined image value within a length l and angularly spaced clockwise from said second vector, a fourth vector requiring no detection of said predetermined image value within a length l and angularly spaced clockwise from said third vector,
   a fifth vector requiring detection of said predetermined image value within a length s and angularly spaced clockwise from said fourth vector, and
   a sixth vector requiring no detection of said predetermined image value within a length l and angularly spaced clockwise from said second vector and wherein s<m<l.

24. A set of feature extraction wedge templates as recited in claim 23, further including at least one seventh vector requiring no detection within a distance m, said at least one seventh vector being angularly interposed between at least one of said first and said sixth vectors and said third and said fourth vectors.

25. A set of feature extraction wedge templates as recited in claim 23, wherein said second and fifth vectors are angularly separated from at least one of said first, third, fourth and sixth vectors by an angle of approximately 45°.

26. A set of feature extraction wedge templates as recited in claim 18 wherein one of said wedge templates includes
   a first vector requiring no detection of said predetermined image value within a length l,
   a second vector requiring no detection of said predetermined image value within a length m and angularly spaced clockwise from said first vector,
   a third vector requiring detection of said predetermined image value within a length s and angularly spaced clockwise from said second vector,
   a fourth vector requiring no detection of said predetermined image value within a length m and angularly spaced clockwise from said third vector,
   a fifth vector requiring no detection of said predetermined image value within a length l and angularly spaced clockwise from said fourth vector, and
   a sixth vector requiting detection of said predetermined image value within a length s and angularly spaced clockwise from said second vector and wherein s<m<l.

27. A set of feature extraction wedge templates as recited in claim 26, wherein said third vector is angularly separated from at least one of said second and fourth vectors by an angle of approximately 45° and said sixth vector is angularly separated from said first and fifth vectors by an angle of approximately 90°.

28. A set of feature extraction templates for use with bright-field illumination and for detecting three-dimensional defects in a structure, said feature extraction templates being positioned between portions of an imaged pattern of said structure, said feature extraction templates comprising:

two angularly separated vectors having an origin;

at least one vector angularly interposed between said two angularly separated vectors; and means for determining a presence of said three-dimensional defects in said structure, said means for determining including a means for registering detection of a predetermined image value within a predetermined distance from said origin along each of said two angularly separated vectors and for providing a first output; and a means for registering no detection of said predetermined image value along said at least one vector angularly interposed between said two angularly separated vectors for a distance greater than said predetermined distance, and for providing a second output; and means for detecting said three-dimensional defects in said structure based on said first and second outputs.

29. A set of feature extraction templates for use with bright-field illumination and for detecting defects in a structure, said defects including three-dimensional defects, said feature extraction templates being positioned between portions of an imaged pattern of said structure, said feature extraction templates comprising:

two angularly separated vectors having an origin;

at least one vector angularly interposed between said two angularly separated vectors; and means for determining a presence of said three-dimensional defects in said structure, said means for determining including:

a means for registering detection of a predetermined image value within a predetermined distance from said origin along each of said two angularly separated vectors, and for providing a first output; and a means for registering no detection of said predetermined image value along said at least one vector angularly interposed between said two angularly separated vectors for a distance greater than said predetermined distance, and for providing a second output, and means for detecting said three-dimensional defects in said structure based on said first and second outputs.

* * * * *